United States Patent

Huchette et al.

[15] 3,682,466
[45] Aug. 8, 1972

[54] COMPOSITE BELLEVILLE TYPE SPRINGS AND MANUFACTURE

[72] Inventors: Paul V. Huchette, Latrobe; Homer H. Hall, Jr., Vandergrift, both of Pa.

[73] Assignee: Edgewater Corporation

[22] Filed: May 4, 1970

[21] Appl. No.: 34,127

[52] U.S. Cl. ..................267/161, 267/149, 156/177
[51] Int. Cl. ..............................................F16f 1/32
[58] Field of Search................161/42, 55, 57, 58, 59; 156/177, 181; 267/161, 162, 149

[56] References Cited

UNITED STATES PATENTS

| | | | |
|---|---|---|---|
| 2,157,183 | 5/1939 | Mullen | 156/181 |
| 3,321,200 | 5/1967 | Polhemus | 267/149 |
| 3,490,983 | 1/1970 | Lee | 161/156 |
| 3,375,000 | 3/1968 | Seamands | 267/162 |
| 3,546,057 | 12/1970 | Jenkins | 161/58 |
| 3,029,071 | 4/1962 | Wells | 267/161 |
| 3,504,849 | 4/1970 | Quinn | 267/161 |

*Primary Examiner*—Arthur L. La Point
*Assistant Examiner*—D. W. Keen
*Attorney*—Shanley and O'Neil

[57] ABSTRACT

Disc spring fabrication of composites, such as fiber glass in epoxy with fiber orientation, composite material, and mounting technique teachings to produce disc springs of uniform high strength, high durability, long fatigue life in high frequency cycling applications, and desirable physical characteristics, such as low weight, electrical insulation, lack of corrosion, graduated loss of load-carrying capacity, and the like.

16 Claims, 14 Drawing Figures

PATENTED AUG 8 1972 3,682,466

INVENTORS
PAUL V. HUCHETTE
HOMER H HALL, JR.

BY Shanley & O'Neil

ATTORNEYS

COMPOSITE BELLEVILLE TYPE SPRINGS AND MANUFACTURE

This invention is concerned with disc springs fabricated from composites, i.e. a material put together from two or more components.

The Belleville or disc spring has numerous engineering advantages over other types of springs in the selectability of load deflection and load-carrying characteristics especially when the variation of stack arrangements available, utilizing a plurality of individual discs, is considered.

Disc springs have been made generally from high strength carbon and low alloy steels. One disadvantage of such materials, as commercially available, is the unidirectional properties stemming from unidirectional rolling in the manufacture of the steel plate from which individual disc springs are cut. While such steel springs have been satisfactory for many high load, substantially static load applications, they have numerous disadvantages such as poor fatigue life in applications where a high frequency working cycle is involved. Other disadvantages for many applications are related to physical properties such as high density (weight), corrosiveness, electrical conductivity, and the like.

No product has been available commercially to seriously compete with steels for the overwhelming majority of applications of disc springs. A primary objective of the invention is to assemble composite material so as to develop unique properties not previously available in disc springs and supplant conventional materials for numerous disc spring applications.

The variations in stress encountered across a section of a disc spring has created serious problems for the most commonly used spring materials. A compressive stress, at the upper face of a disc spring, varies drastically from a maximum at the inner diameter to near zero at the outer diameter. At the same time, tensile stress at the bottom face of the spring also varies from a maximum at the inner diameter to a minimum at the outer diameter. The stresses encountered are both radial and tangential in direction, with the tangential stress being most damaging to spring life.

To meet the variations in stress encountered in disc springs, the present invention teaches use of a composite comprising elongated filaments or fibers positioned in a strong matrix. Proper orientation of the filaments or fibers is an important concept of the invention. This concept makes use of the high strength characteristics of the fibers along their longitudinal dimension to withstand the varying stresses, tangential and radial, encountered. The orientation concept taught, the spring fabrication methods taught, and the resultant product provide unusual advantages in strength, uniformity, and durability of disc springs and in selectivity of materials and applications for disc springs.

The drawings, which will be used in further disclosure of the invention, include the following views.

Figure 4:
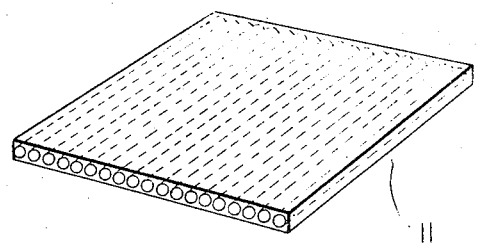
Figure 5:
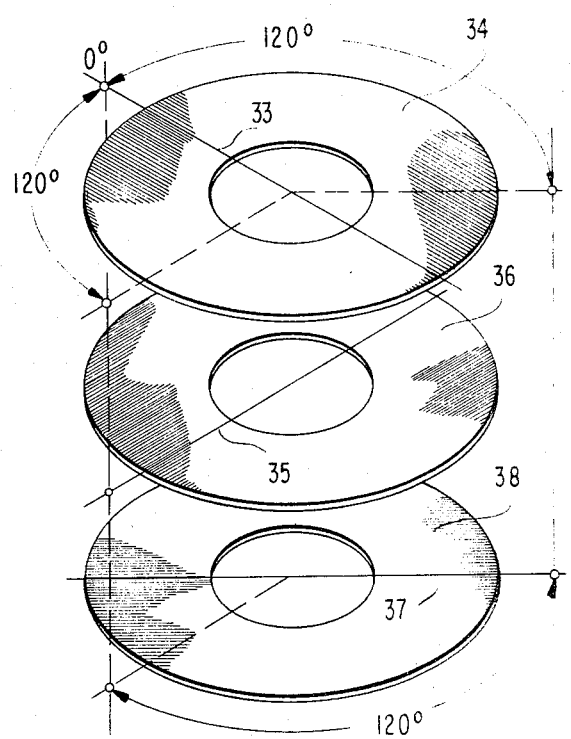
Figure 6:
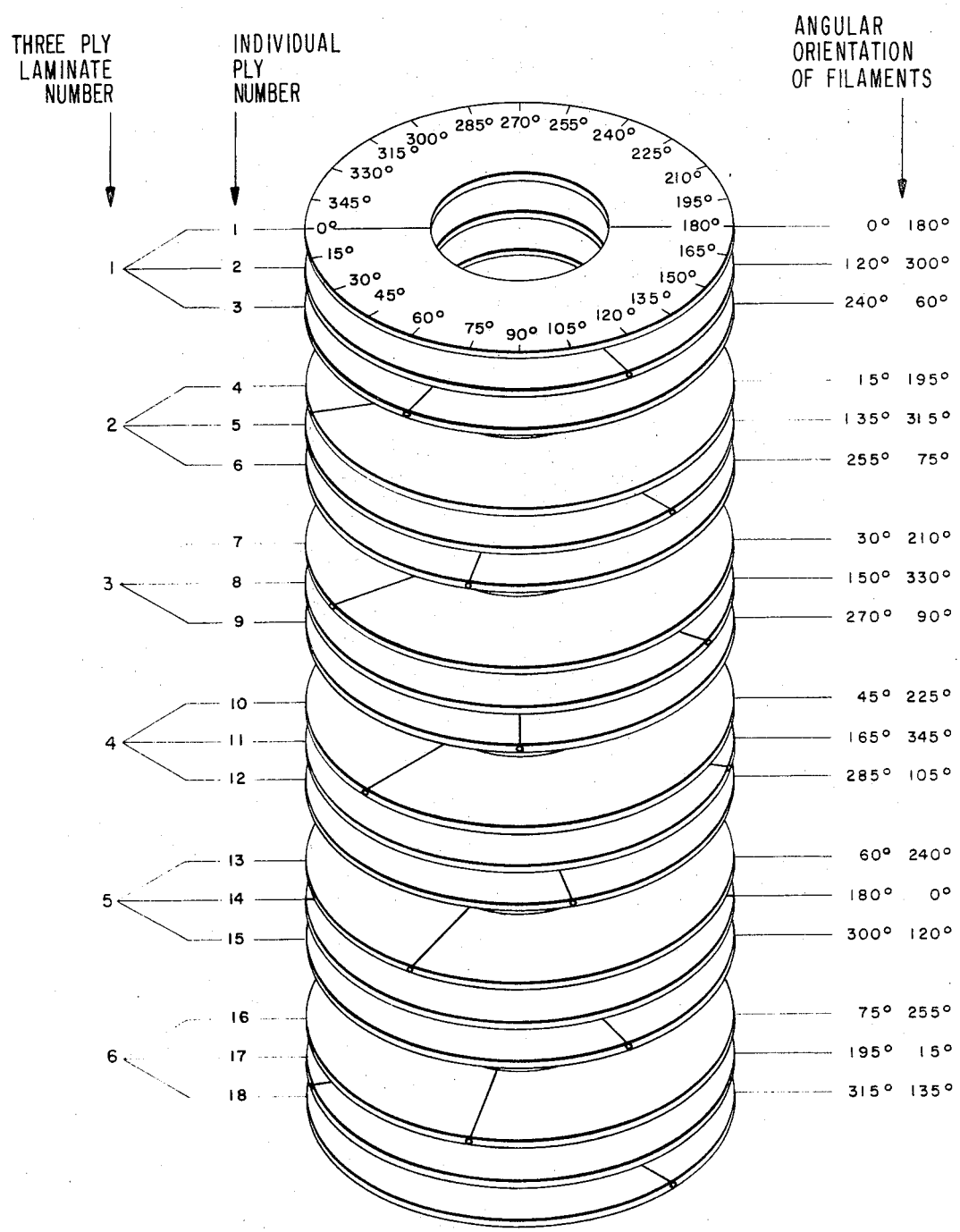
Figure 7:
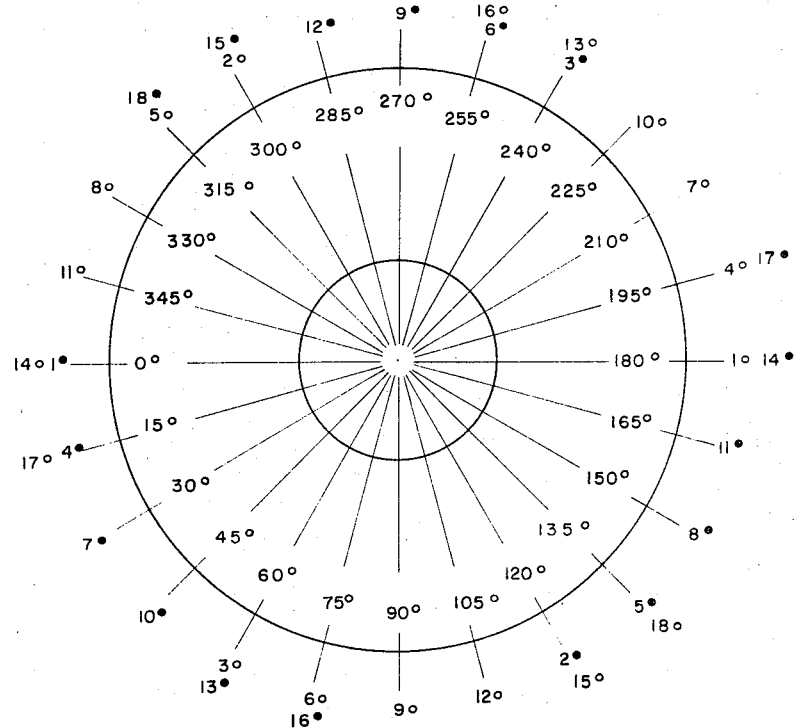
Figure 8:
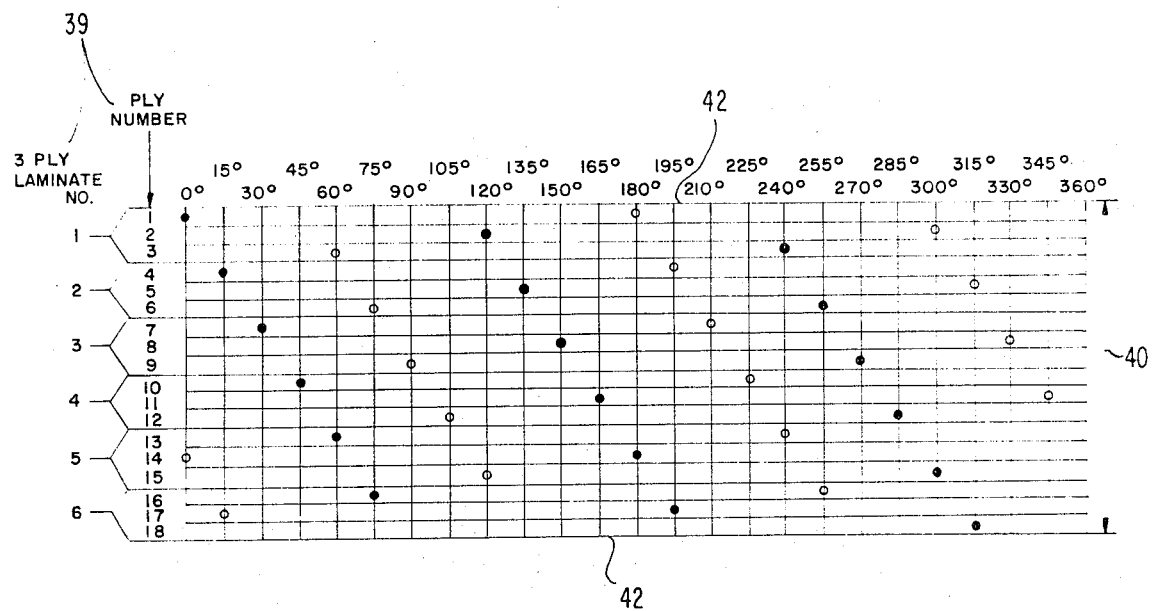
Figure 9:
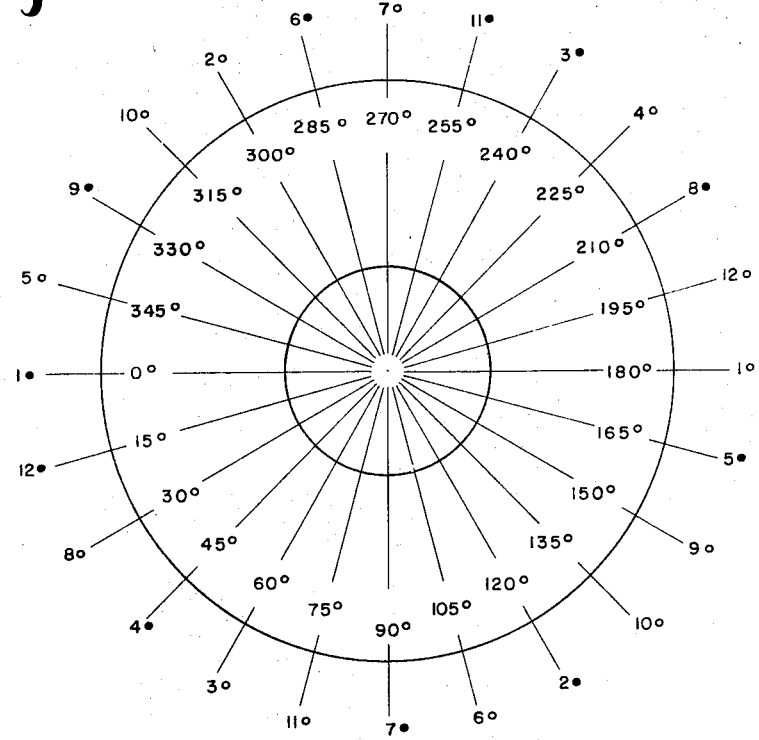
Figure 10:
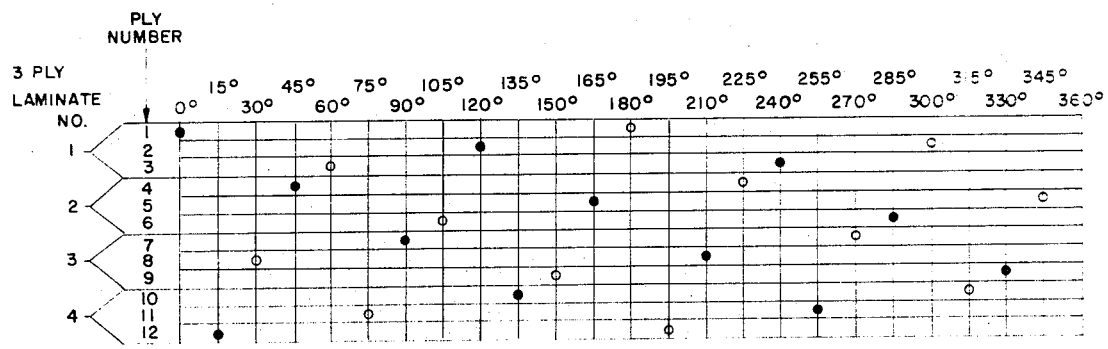
Figure 11:
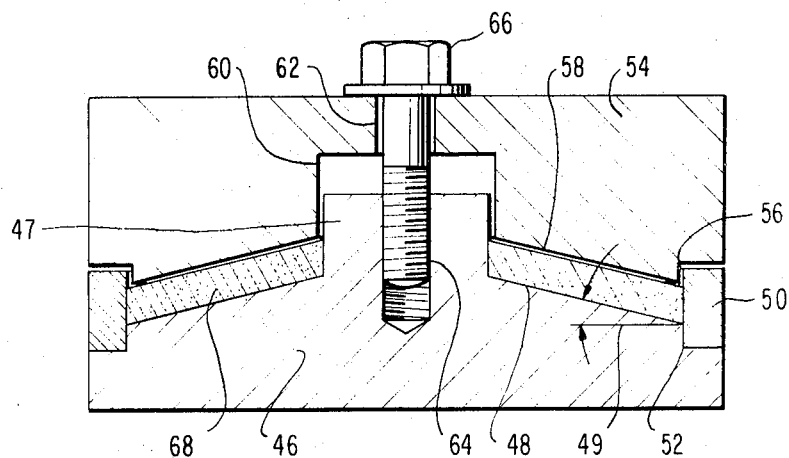
Figure 12:
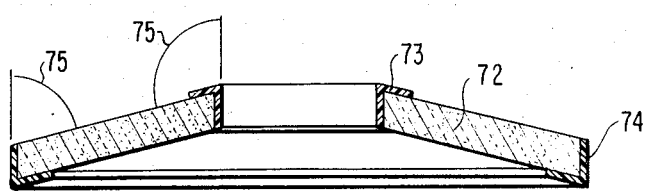
Figures 13, 14:
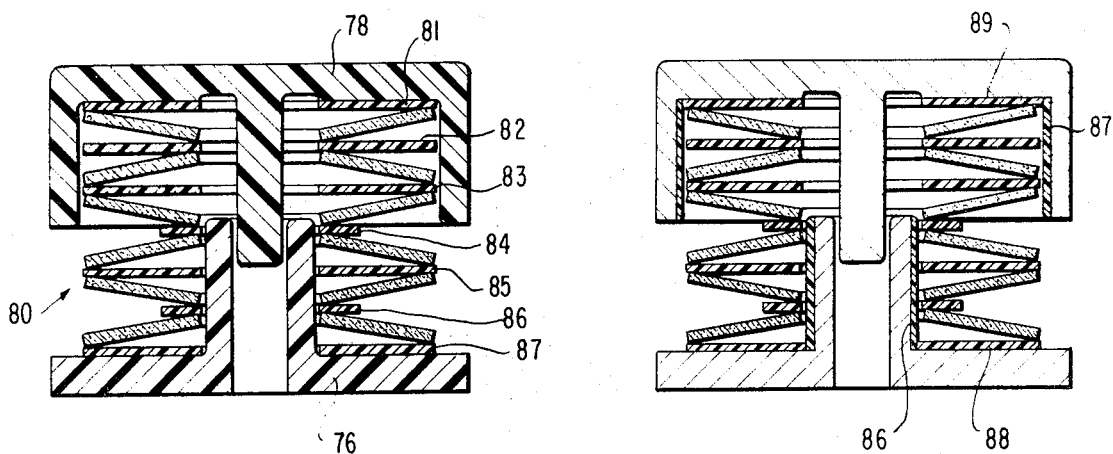

FIG. 4 is an enlarged perspective view of a portion of a composite ply forming part of the present invention, FIG. 5 is a perspective view of a multi-ply composite forming part of the present invention, FIGS. 6, 7, and 8, respectively, are perspective view, plan view, and sidewall view diagrammatic representations of fiber orientation in a specific embodiment of the invention, FIGS. 9 and 10, respectively, are plan view and sidewall view diagrammatic representations of fiber orientation in another embodiment of the invention, FIG. 11 is a schematic cross-sectional view of apparatus for forming disc springs in accordance with the present invention, FIG. 12 is a cross-sectional view of a disc spring embodying the invention, and FIGS. 13 and 14 are schematic cross-sectional views of disc spring stack arrangements embodying the invention.

Figure 1:
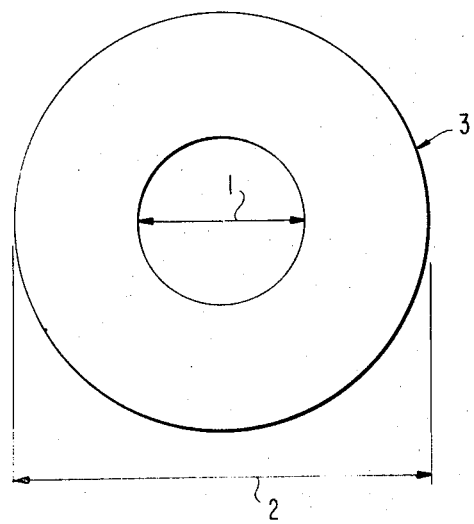
FIG. 1 is a plan view of a disc spring.

While Bellevilles or disc springs may have other shapes, they are conventionally toroidal in a plan view as shown in FIG. 1. Inner diameter 1 and the outer diameter 2 are part of the descriptive nomenclature. Disc spring 3 can be spherical, flat, conical, or radially tapered in cross section. However the most commonly used type of disc spring is a radially-straight, conical disc.

Figure 2:
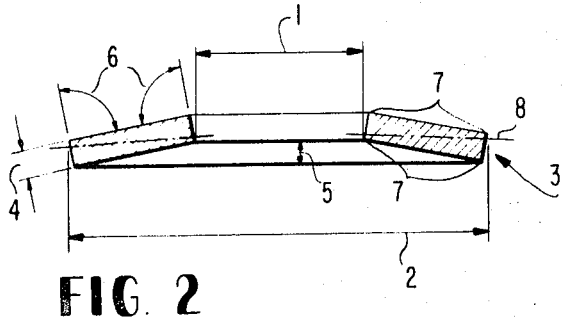
FIG. 2 is a cross-sectional view of a disc spring.

The thickness dimension 4 and the dish height 5 as conventionally measured are shown in the cross-sectional elevation view of the radially-straight, coned disc embodiment of spring 3 shown in FIG. 2. Corner angles 6 may be 90 degrees or any other angle. Corners 7 may be sharp or rounded.

Loads are applied to the plan view surfaces, generally uniformly near the inner and outer diameter, of a disc spring and cause elastic deflection. The stresses within the spring are at a maximum near the inner diameter surfaces. Compressive stresses exist in the upper portion of the spring, above the neutral axis 8, and tensile stresses exist in the bottom portion of the spring upon loading. Objectives of the invention such as high strength, uniformity, and durability in disc spring structures are accomplished by predetermined orientation of elongated fibers of a composite so as to take advantage of the maximum strength characteristics of the fibers in their longitudinal direction.

Figure 3:
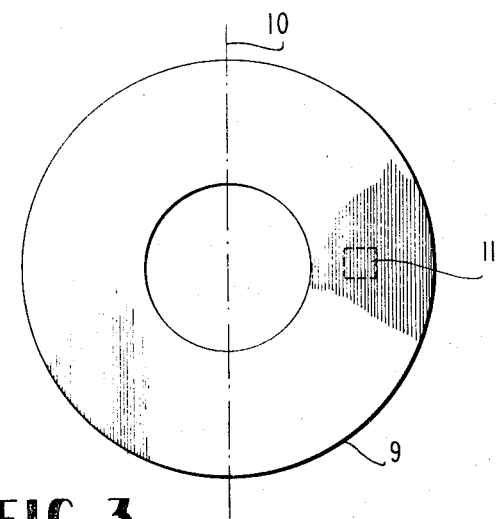
FIG. 3 is a plan view of composite ply forming part of the present invention.

Glass filaments or fibers in an epoxy matrix comprises a suitable composite for purposes of describing a specific embodiment. Non-woven, elongated, directionally aligned fibers are relied on to accomplish the major objectives of the invention. Such fibers are placed in the matrix material in side-by-side, substantially parallel relationship as shown in FIG. 3. Material with fibers oriented in this manner can be obtained commercially in sheets or strip form under the trademark Scotchply Brand Reinforced Plastic, Type 1002-XP 250 and others depending on the resin characteristics desired, from the 3M Company, Minneapolis, Minn. Disc 9 would ordinarily be cut from a sheet of such material. The diametral axis 10 of the composite ply 9 is coincident with the longitudinal direction of the fibers.

Such fiber reinforced plastic materials are available commercially in a single ply as shown in FIG. 4 which shows an enlarged view of portion 11 of FIG. 3 and, are also available in multi-ply forms. Multi-ply laminates prepared to specification and fabricated in accordance with the teachings of the invention have advantages over single ply material in production economies.

The fibers in each ply are unidirectional in the fiber glass-epoxy composite fabrication method of the specific embodiment being considered. A representative orientation for a three-ply laminate is 120° angular spacing. For example, in FIG. 5 the fibers of ply 34 having diametral axis 33 are directionally aligned at 0°. The fibers in ply 36 having diametral axis 35 are disposed at 120° from the fibers in ply 34. The fibers in ply 38 with diametral axis 37 have an angular spacing of 120° from fibers in ply 34 and 36.

The object in fiber orientation concepts taught by the present invention is to approach isotropic strength properties in build-up of a disc spring from composite materials. While single ply material can be used in the build-up of the desired thickness of a disc spring in accordance with the invention, advantages in assembly time, without sacrifice of isotropic strength properties, can be obtained using multi-ply laminates. A preferred fabrication method will be described using the three-ply laminate of FIG. 5; those skilled in the art will be able to adopt the teachings of this example to single ply or numerically different multi-ply laminae. What is taught is a fiber orientation which will most nearly approach isotropic strength properties throughout the disc spring. Such properties have not been previously available in the disc spring art.

A A preliminary step is determination of dimensions. There is practically no limit to the combination of ID's, OD's, and thicknesses available with the fabrication methods taught. Established spring design theories are generally applicable, such as the thicker the spring the heavier load-carrying capacity. However, spring design theories need not be reviewed in detail for purposes of disclosing the invention and the thickness is the only dimension which need be considered at this point. Continuous, non-woven glass fibers bound together by an epoxy resin, with the glass fibers having a specifically oriented configuration are suitable. All the fibers in each ply are oriented in one direction, that is, parallel to each other. So a desired thickness of spring is built up of multiple plies. For example with a glass-epoxy composite ply containing glass fibers that will cure to 0.010 inch thickness it will require eighteen single plies or six of the three-ply laminates shown in FIG. 5 to build up a thickness of 0.18 inch.

In order to obtain optimum isotropic strength properties throughout the disc spring, discs cut from the multi-ply laminates of FIG. 5 are laid up with the 0° diametral axis of the first ply of each laminate rotated 15° from the 0° diametral axis of the first ply of the next previous laminate in a progressive manner. With the fibers of the first ply of the first laminate arranged along the 0°–180° direction, the lay-up of the six three-ply laminates in a 0.18 inch thickness spring illustrated in FIG. 6 and described in Table I following.

TABLE I

| Multi-Ply Laminate Number | Ply Number | Angular Orientation of Filaments |
|---|---|---|
| 1st | 1 | 0°–180° |
| 1st | 2 | 120 –300 |
| 1st | 3 | 240 –060 |
| Rotate second laminate 15° from first ply of first laminate | | |
| 2nd | 4 | 15 –195 |
| 2nd | 5 | 135 –315 |
| 2nd | 6 | 255 –075 |
| Rotate third laminate 15° from first ply of second laminate | | |
| 3rd | 7 | 30 –210 |
| 3rd | 8 | 150 –330 |
| 3rd | 9 | 270 –090 |
| Rotate fourth laminate 15° from first ply of third laminate | | |
| 4th | 10 | 45 –225 |
| 4th | 11 | 165 –345 |
| 4th | 12 | 285 –105 |
| Rotate fifth laminate 15° from first ply of fourth laminate | | |
| 4th | 13 | 60 –240 |
| 4th | 14 | 180 – 0 |
| 4th | 15 | 300 –120 |
| Rotate sixth laminate 15° from first ply of fifth laminate | | |
| 6th | 16 | 75 –255 |
| 6 | 17 | 195 –15 |
| 6th | 18 | 315 –135 |

Specifying of 0.180 inch thickness for the finished disc spring given as an example in FIG. 6 is not to be construed as limiting the scope of this invention regarding dimensions. The thickness of the springs covered by this invention may be any dimension that may be required by the trade.

FIG. 7, in which the 0°–180° axis is across the page left to right, shows in plan view the orientation of the diametral axes of each ply in the six-laminate assembly of FIG. 6. In this plan view, FIG. 7, the angular orientation, 0° through 360°, is set forth radially inwardly of the outer diameter periphery. The ply number for each ply in the assembled product is set forth radially outwardly of the outer diameter periphery. Each three-ply laminate is rotated 15° with relation to the previous three-ply laminate, as indicated in Table I and FIG. 6 throughout the six layers. Each laminate includes three plies in which the fibers in each ply are oriented at 120° from the fibers in the remaining plies as described in relation to FIG. 5. As seen in FIG. 7, the diametral axes fibers of the individual plies are distributed about the circumference so that at least one ply of fibers is located at each 15° angle through the full 360°. Also, repetitions in ply orientations, occurring at designated angles, are uniformly distributed about the circular structure.

FIG. 8 shows a diagram representing in developed elevation view the points where the diametral axis fiber of each ply intersects and ends at the peripheral surface of the outside diameter of the spring. The solid dots represent one end of the diametral axis fibers and the circle dots represent the opposite ends of the respective diametral axis fibers.

The outside diameter periphery of the spring is laid out from 0° to 360° in 15° intervals. The ply numbers and three-ply laminate numbers 39 are designated at the left end of the diagram.

It will be seen from this diagram that the diametral axis fibers (which are representative of the direction of all the fibers in a particular ply) are distributed in an orderly manner throughout the thickness 40 of the spring. Note that in FIG. 8 the plot of the location of the ends of the diametral axis fibers fall on a series of straight, spirally directed, lines between the upper surface 42 and the lower surface 44. Such imaginary lines through the plots of longitudinal ends of diametral axes fibers are at a uniform inclination and parallel to each other. This predetermined orderly pattern of fiber direction arrangement, from upper surface to bottom surface of a disc spring, is preferred for development of desired spring characteristics, such as uniformity and durability.

However, suitable uniformity, strength, and durability can also be obtained with the three-ply 120° orientation laminates by rotation of the laminates in multiples of 15° or other smaller angles. For example, Table II below sets forth the angled relationship when four such laminates rotated 45° in relation to each other are assembled.

TABLE II

| Multi-Ply Laminate Number | Ply Number | Angular Orientation of Filaments | |
|---|---|---|---|
| 1st | 1 | 0° | −180° |
| 1st | 2 | 120 | −300 |
| 1st | 3 | 240 | −060 |
| Rotate second laminate 45° from first ply of first laminate | | | |
| 2nd | 4 | 45 | −225 |
| 2nd | 5 | 165 | −345 |
| 2nd | 6 | 285 | −105 |
| Rotate third laminate 45° from first ply of second laminate | | | |
| 3rd | 7 | 90 | −270 |
| 3rd | 8 | 210 | −030 |
| 3rd | 9 | 330 | −150 |
| Rotate fourth laminate 45° from first ply of third laminate | | | |
| 4th | 10 | 135 | −315 |
| 4th | 11 | 255 | −075 |
| 4th | 12 | 015 | −195 |

FIGS. 9 and 10 present, in the manner previously described for FIGS. 7 and 8, the circumferential distribution and thickness distribution, respectively, of individual plies of the four-laminate spring of Table II.

FIG. 11 shows in cross-section a mold structure used for assembling a disc spring in accordance with the present invention. In this mold structure, male base member 46 includes a center post portion 47 of a diameter equal to the desired internal diameter of the disc spring to be fabricated. From center post 47 the base member configuration slants radially along surface 48 at an angle 49 toward the outer diameter periphery. Angle 49 is determined by the desired height of the end product disc. Surface 48, as shown in FIG. 11, produces a radially-straight coned disc spring. For a spherical cross section, or other shaped disc spring, this surface configuration would vary.

Circumferential ring 50 has an internal diameter equal to the outer diameter of the spring being fabricated. Ring 50 rests in the recessed corner portion 52 of male base member 46.

The individual plies or laminates cut to the desired inner and outer dimensions are placed over center post 47 of male base member 46. With ring 50 in place, the female mold member 54 is placed over the center post. Female member 54 includes: a recessed corner portion 56 conforming to the ring 50 around its periphery, a radially slanted surface 58 parallel to surface 48 of male base member 46, and an internal circular recess 60 for receiving the male center post 47.

The female mold member 54 configuration also defines aperture 62. The center post 47 of the male base member 46 defines a threaded aperture 64. Locking cap screw 66 is inserted through aperture 62 of female mold member 54 and threaded into aperture 64 of male base member 46. Predetermined pressures on the disc shaped plies 68 in the mold are applied by adjustment of lock head screw 66.

During fabrication of a glass fiber-epoxy disc spring in accordance with the invention, a mold such as that shown in FIG. 11 is preheated to approximately 200° C. Lower preheat temperatures may be used for larger molds. The preheated mold is coated on all contact surfaces with a parting agent such as silicone oil, for example Dow-Corning DC 20 Silicone, available from the Dow-Corning Corporation of Midland, Mich. 48640, or GARAN 225 Mold Release available from Ram Chemical Co., Gardena, Calif. 90247.

The uncured spring, with plies laid up in a predetermined angular relationship, is placed in the preheated and lubricated mold, the mold closed, and a fraction of the final pressure, e.g. a pressure of several psi is applied. The mold is then placed in the furnace and heated to a temperature between about 135° C. and about 200° C. dependent on the gel time desired for the plastic. At roughly 165° C. about four minutes is allowed for full gel time for the spring of FIGS. 6, 7, and 8 having a thickness of 0.18 inch, OD of three and a half inches, and an ID of one inch. Gel time is temperature dependent, e.g. 135° C. about seventeen minutes, 150° C. about nine minutes, 160° C about four and a half minutes.

Shortly before gel of the plastic, e.g. after three minutes at 165° C., with the above spring, the mold is removed from the furnace and maximum pressure applied, about 50 psi. The mold is then returned to the furnace with mold temperature being maintained as required for the curing cycle. The thickness of the spring determines the length of time required for curing. The operation can be modified or changed, e.g. to eliminate the removal from the furnace step to apply full pressure.

After curing, the mold is removed from the furnace and cooled to room temperature. The mold parts are separated and the cured spring removed. To allow for ease of removal, the cut discs for a one-inch center post can be cut to a diameter of approximately 1.04 inch. The three-piece structure of the mold, i.e. wit ring 50 separable from male member 46 and female member 54 also facilitates removal by avoiding hang-ups in a fixed recess. Post-curing treatments after cooling may be employed. The glass fibers constitute about 65 percent by weight of the cured spring.

In one curing cycle the disc is maintained in the mold at full pressure and high temperature for a relatively short period of time. For example, with the about 0.18 inch thickness spring, the curing cycle at 165° C. should extend between thirty-five and forty minutes. An optional curing cycle is to maintain a temperature of 165° C. for five to ten minutes and then provide an oven post-cure at a lower temperature, approximately 140° C. for about fifteen hours.

One of the primary advantages of the fiber reinforced plastic spring is its ability to undergo elastic deformation and return to its original shape through a large number of cycles. For example, a spring laid up as shown in FIGS. 7 and 8 with dimensions of 10.0 inches OD × 2.5625 inches ID × 0.330 inch thickness made up of eleven multi-ply laminates of 15° angular orientation was cycled from free height through two-thirds flattening for ten million cycles at a compressive stress in excess of 30,000 pounds per square inch with no evidence of failure being indicated. The same spring at an increased compressive stress in excess of 40,000 pounds per square inch, which deflected the spring 0.02 inch beyond the flat position, was flexed through an additional ten million cycles. In approaching the end of the test, some loss of load-carrying capacity was experienced and a slight fretting or delamination occurred at the internal diameter, but the spring did not fail.

Those familiar with the art know that a steel disc spring, while requiring a much higher pressure for full deflection, would, under ordinary circumstances, have a fatigue life much below five hundred thousand cycles. Also, that there is no such thing as a graduated failure with a steel spring. One of the advantages of composite springs, as taught, is graduated loss of load-carrying capacity rather than complete failure. The advantages in avoiding replacement crises are obvious.

A problem with glass fiber-epoxy springs considered in the invention is poor abrasion resistance. The invention teaches use of selected spring liners or washers to eliminate this problem. Suitable low friction or abrasion-resistant materials are poly-urethane, Teflon (Du-Pont), Nylatron (Polymer Corporation), nylons and polyamides. In the cross-sectional view of the spring shown in FIG. 12, the body portion 72 is fiber reinforced plastic while bearing caps 73 and 74 are one of the above materials. These materials can also be used as washers in an assembled spring. In FIG. 12 angles 75 can be any angle but angles close to 90° are preferred by the trade.

Composite disc springs can be used in the various stacking arrangements commonly used with disc springs. That is parallel arrangements, series arrangements, or a combination of series-parallel arrangements. The support structure for applying a load to a disc spring, i.e. the bushings or exterior housings used for steel spring stacks can be used similarly for composite springs utilizing abrasion-resistant bearing surfaces where needed for certain composites.

In FIG. 13 bushing 76 can be made of Nylatron as can be the top load-bearing member 78. A plurality of individual disc springs are arranged in series 80 as shown. Intermediate each disc spring and at each end is a polyurethane washer as shown at 81,82,83,84,85,86, and 87.

If a support structure as shown in FIG. 13 is required to be metallic, then an abrasion-resistant lining material can be placed intermediate contact surfaces. Also, an inner and an outer diameter bearing cap of an abrasion-resistant material can be used on each disc as exemplified in FIG. 12. Or, as shown in FIG. 14, Nylatron bearing surfaces such as bushing sleeves 86 and 87 and bearing inserts 88 and 90 can be used with an otherwise metallic structure.

Use of abrasion-resistant materials is taught for composites with polymer matrices, such as epoxies and polyesters. The above examples of abrasion-resistant materials are representative. Other suitable materials exist. Certain composites may suitably be used without abrasion-resistant plastic washers, liners, and the like, and rely on the liquid or fine powder lubricants especially under substantially static load bearing conditions.

Glass fiber-epoxy raw materials are readily available commercially for composite fabrication of disc springs as described. Because of the brittle nature of glass, filaments which make up the fiber glass strand do not ordinarily exceed 0.001 inch. Graphite filaments of similar or smaller diameter, e.g. 6.6 microns can be used. Graphite fibers are highly suitable for disc spring uses. The tensile modulus of elasticity for graphite fibers may be as high as 50 million pounds per square inch. Other examples of fibers include boron and beryllium. With the varying strength fibers available, there is a high degree of selectivity of spring characteristics available through selection of composite components.

While specific embodiments of the invention have been described in which a glass fiber-epoxy composite was used, the invention is not limited to this composite. It is to be understood that the invention extends to other suitable composites and other configurations than those illustrated for disc spring applications. With the teachings of the present invention a variety of suitable fibers and matrices may be utilized so that the scope of the invention is to be determined from the appended claims.

What is claimed is:

1. A solid toroidal, unitary disc spring of composite material, defining at least a portion of a conical surface, comprising non-woven, elongated fibers held in a plurality of layers by a matrix material, the fibers in each layer being in substantially parallel, side-by-side relationship, with the fibers in each layer being unidirectionally oriented longitudinally and having a predetermined angular relationship to fibers in a contiguous layer.

2. A toroidal disc spring defining at least a portion of a conical surface comprising a plurality of plies of non-woven, directionally-oriented, elongated fibers, such plies being in overlaying relationship, the fibers in each ply being unidirectionally oriented longitudinally and in substantially parallel relationship to each other, with the plurality of plies and fibers of each ply being bonded into a solid unitary structure.

3. The disc spring of claim 2 in which the plurality of plies are dimensionally uniform defining a uniform thickness between inner and outer diameter peripheries of the disc spring.

4. The disc spring of claim 3 with the diametral axis of each ply being coincident with the longitudinal direction of the fibers of such ply, in which the diametral axes of the plurality of plies are distributed throughout the thickness of the disc spring structure in a predetermined order.

5. The disc structure of claim 2 in which the unidirectional fibers in each ply are oriented in predetermined angular relationship to fibers in at least a portion of the remaining plies.

6. The disc spring of claim 2 with the diametral axis of each ply being coincident with the longitudinal direction of the fibers of such ply, in which the diametral axes of the plurality of plies are distributed substantially uniformly about the disc spring structure.

7. The disc spring of claim 2 in which the fibers are glass.

8. The disc spring of claim 7 in which the fibers are of a diameter no greater than about 0.001 inch.

9. The disc spring of claim 2 in which the fibers are bonded together by a temperature-responsive plastic.

10. The disc spring of claim 9 in which the plastic is selected from the group consisting of epoxies and polyesters.

11. The structure of claim 2 in which the fibers are graphite.

12. The structure of claim 11 in which the fibers have a diameter no greater than about 0.001 inch.

13. In combination with a disc spring as set forth in claim 2
   support structure means for applying a load to the disc spring.

14. The combination of claim 13 in which the support structure means comprises
   an abrasion-resistant plastic.

15. The combination of claim 13 further including abrasion-resistant means separating contact surfaces between the disc spring and the support structure.

16. The combination of claim 13 including
   a plurality of disc springs, and
   abrasion-resistant means separating contact surfaces between the individual disc springs and between the disc springs and the support structure.

* * * * *

UNITED STATES PATENT OFFICE
CERTIFICATE OF CORRECTION

Patent No. __3,682,466__          Dated __August 8, 1972__

Inventor(s) __Paul V. Huchette and Homer H. Hall, Jr.__

It is certified that error appears in the above-identified patent and that said Letters Patent are hereby corrected as shown below:

Column 3 (TABLE I) line 63, change "11" to --1--.

Column 4 (TABLE I) line 3, "150" should be printed in alignment with the rest of the column; same column, lines 9, 10, and 11, change "4th" to --5th--; same column, line 14, change "6" to --6th--.

Column 5 (TABLE II) line 14, change "st" to --1st--; same line, "0°" should be printed in alignment with the rest of the column; line 15, change "11st" to --1st--; line 19, "- 345" should be printed in alignment with the rest of the column.

Column 6, line 42, change "wit" to --with--.

Signed and sealed this 9th day of January 1973.

(SEAL)
Attest:

EDWARD M. FLETCHER, JR.
Attesting Officer

ROBERT GOTTSCHALK
Commissioner of Patents